(12) United States Patent
Smallman et al.

(10) Patent No.: US 9,795,236 B2
(45) Date of Patent: Oct. 24, 2017

(54) FOLDABLE TRAY

(71) Applicants: Derek Smallman, Naples, FL (US); Susan Smallman, Naples, FL (US)

(72) Inventors: Derek Smallman, Naples, FL (US); Susan Smallman, Naples, FL (US)

( * ) Notice: Subject to any disclaimer, the term of this patent is extended or adjusted under 35 U.S.C. 154(b) by 0 days.

(21) Appl. No.: 14/605,098

(22) Filed: Jan. 26, 2015

(65) Prior Publication Data

US 2015/0129734 A1    May 14, 2015

Related U.S. Application Data

(63) Continuation of application No. 13/792,709, filed on Mar. 11, 2013, now abandoned.

(51) Int. Cl.
| | |
|---|---|
| *A47B 23/00* | (2006.01) |
| *A47B 37/00* | (2006.01) |
| *A47G 23/06* | (2006.01) |
| *B65D 1/34* | (2006.01) |
| *A47G 23/03* | (2006.01) |
| *A47J 47/00* | (2006.01) |

(52) U.S. Cl.
CPC ......... *A47G 23/06* (2013.01); *A47G 23/0303* (2013.01); *B65D 1/34* (2013.01); *A47B 23/002* (2013.01); *A47J 47/005* (2013.01); *Y10T 29/49826* (2015.01); *Y10T 29/49947* (2015.01)

(58) Field of Classification Search
CPC ............... A47G 23/0633; A47G 23/06; A47G 23/2303; B24D 5/005; B42D 5/005; B42F 5/00; B42F 5/06; B42F 1/00; B42F 1/003; B42F 1/006; A47J 47/005; B65D 1/34; A47B 23/001; A47B 23/002

USPC ...... 108/42, 43, 44, 49, 55.1, 115, 121, 125, 108/126, 127, 129, 130, 59, 166, 167, 108/168, 169, 165

See application file for complete search history.

(56) References Cited

U.S. PATENT DOCUMENTS

| | | | | | |
|---|---|---|---|---|---|
| 729,763 | A | * | 6/1903 | Hartmann | B42F 13/00 402/53 |
| 2,876,021 | A | * | 3/1959 | Potts | B42D 5/005 281/44 |
| 3,466,133 | A | * | 9/1969 | Lennartz | B42F 3/003 402/14 |
| 3,645,561 | A | * | 2/1972 | Kendall | B42D 12/00 24/67.7 |
| 5,028,075 | A | * | 7/1991 | Donnelly | B42F 9/00 248/451 |

(Continued)

*Primary Examiner* — Daniel J Troy
*Assistant Examiner* — Andres F Gallego
(74) *Attorney, Agent, or Firm* — Hahn Loeser & Parks LLP

(57) ABSTRACT

A folding tray includes a hygienic surface within the internal portion that is shielded from contamination in a folded configuration. The folding tray includes two symmetrical halves joined by a spine that allows the folding tray to close. The folding tray can include one or more inserted surfaces overlapping at least a portion of the two symmetrical halves on one side of the folding tray. The inserted surfaces can be folded into the folding tray in a folded state. The inserted surfaces can be removable or include a plurality of stacked sheets that are individually removable. The folding tray can be used to isolate materials on the tray from contaminants under the tray, or protect a material beneath the tray from contaminants on the tray.

12 Claims, 5 Drawing Sheets

(56) References Cited

U.S. PATENT DOCUMENTS

| | | | | |
|---|---|---|---|---|
| 5,106,156 | A * | 4/1992 | Marquis | B60N 3/002 |
| | | | | 108/43 |
| 5,611,098 | A * | 3/1997 | Skibik | A42B 1/006 |
| | | | | 108/43 |
| 6,138,966 | A * | 10/2000 | Smith | F16M 13/00 |
| | | | | 108/43 |
| 6,244,400 | B1 * | 6/2001 | Bowers | A45C 3/02 |
| | | | | 150/111 |
| 6,659,675 | B2 * | 12/2003 | Rew | B42D 5/005 |
| | | | | 206/459.5 |
| 6,742,429 | B2 * | 6/2004 | Chen | A47J 47/005 |
| | | | | 269/289 R |
| 6,783,831 | B2 * | 8/2004 | Cho | A47G 23/0303 |
| | | | | 428/343 |
| 6,789,792 | B1 * | 9/2004 | Angland | A47J 47/005 |
| | | | | 269/289 R |
| 6,971,644 | B1 * | 12/2005 | Kennedy | A47J 47/005 |
| | | | | 269/289 R |
| 6,979,778 | B2 * | 12/2005 | Xiong | H05K 5/0234 |
| | | | | 174/158 R |
| 7,697,283 | B2 * | 4/2010 | Mathew | A47B 91/00 |
| | | | | 248/188 |
| 2003/0064189 | A1 * | 4/2003 | Berg | A47G 23/0303 |
| | | | | 428/40.1 |
| 2006/0093788 | A1 * | 5/2006 | Behm | B32B 3/266 |
| | | | | 428/137 |
| 2006/0208410 | A1 * | 9/2006 | McRorie | A47J 47/005 |
| | | | | 269/289 R |
| 2008/0253081 | A1 * | 10/2008 | Tracy | G06F 1/1616 |
| | | | | 361/679.5 |

* cited by examiner

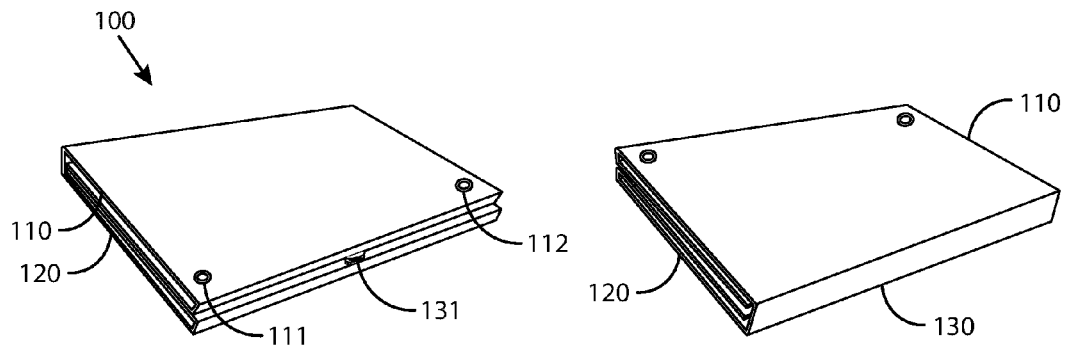
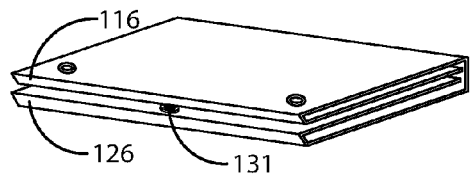
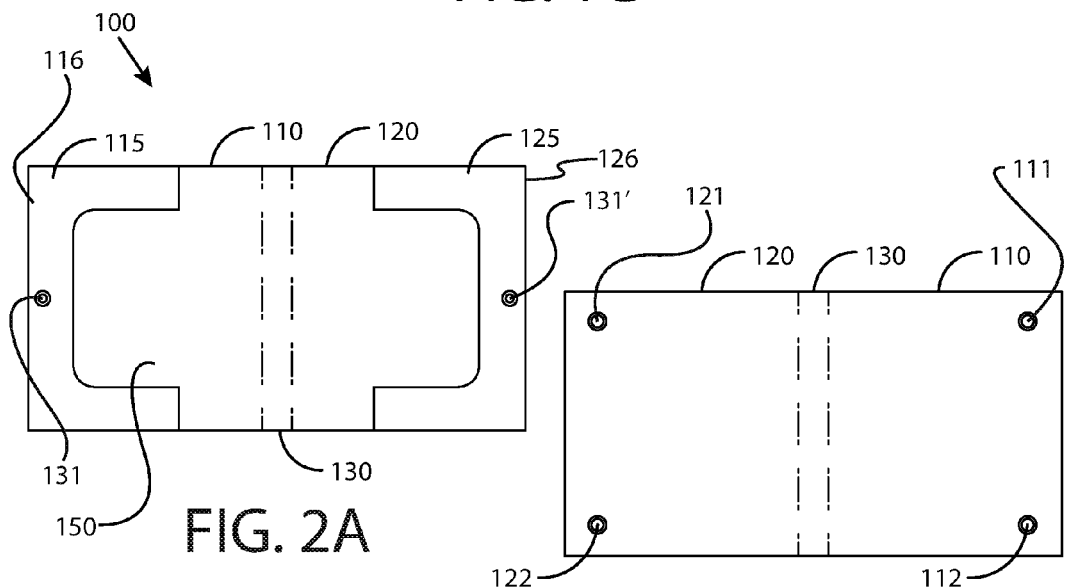

FOLDABLE TRAY

This application claims the benefit of priority to U.S. Utility application Ser. No. 13/792,709, filed Mar. 11, 2013, and entitled "FOLDABLE TRAY." The entirety of the aforementioned application is incorporated herein by reference.

In general, the invention relates to a foldable tray. More particularly, the invention relates to a foldable tray that can be folded for portability. Most particularly, the invention relates to a portable, foldable tray including removable inserts allowing for a clean internal surface upon removal after use.

The invention relates to a folding foldable tray including two or more sections joined by one or more spines that facilitates folding of a hygienic surface within the foldable tray. In an embodiment, a portable foldable tray can comprise a foldable housing comprising at least a first section and a second section, one or more spines connecting the first section and the second section at one or more spine widths, and a foldable internal surface that overlaps a first internal side of the first section and a second internal side of the second section, wherein the foldable internal surface folds along a portion that coincides with the one or more spines.

In a particular embodiment, a folding tray can include a first folding tray component, a second folding tray component, a first pair of insert fasteners symmetrically affixed to an internal portion of the first folding tray component, a second pair of insert fasteners symmetrically affixed to an internal portion of the second folding tray component, a first fold fastener affixed to an external edge of the first folding tray component, a second fold fastener affixed to an external edge of the second folding tray component configured to couple with the first fold fastener, a central spine symmetrically connecting the first folding tray component and the second folding tray component, an insert shell including two pairs of mating fasteners configured to couple with the first pair of insert fasteners and second pair of insert fasteners, and a plurality of insert sheets configured to be stacked in the insert shell.

Aspects herein can further include a method for making a folding tray, comprising forming a folding tray housing including at least a first section, a second section, and a spine. The method can further include attaching one or more fasteners to the folding tray housing and providing one or more inserts that overlap at least a portion of an interior side of the folding tray housing.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIGS. 1A, 1B, and 1C illustrate various perspective views of an example embodiment of a foldable tray in accordance with aspects herein.

FIGS. 2A and 2B illustrate front and back views of an example embodiment of a foldable tray in accordance with aspects herein.

DETAILED DESCRIPTION

Figure 3:
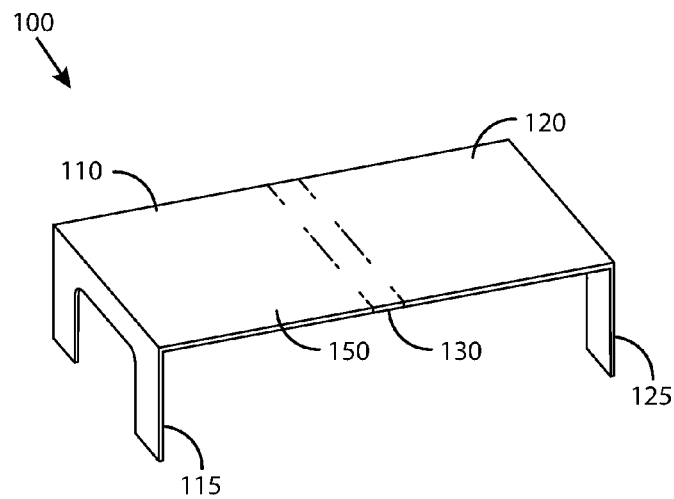
FIG. 3 illustrates a perspective view of an example embodiment of a foldable tray in accordance with aspects herein.

A foldable tray according to the present invention may be used in connection with various environments where it is desired to avoid contact between an available surface and materials on the tray. For example, with respect to the foldable tray's use as a food tray, an alternative eating surface (e.g., restaurant table) may not be sufficiently clean to place food onto directly, or a desire may exist to avoid dirtying the alternative eating surface (e.g., leather-inlaid table). Aspects or particular applications can be directed toward the feeding of small children outside the home. However, other applications will be appreciated upon study of the disclosures herein. A foldable tray as described may be used in any number of environments to guard against contaminating an item on the tray, or an item on which the tray rests. For example, a foldable tray in accordance with the invention can prevent paint drips from staining a table where an article smaller than the foldable tray is being painted or drying. In another embodiment, a foldable tray can be employed in conjunction with a material such as clay or dough to prevent dirt from an unclean surface becoming embedded in the material. These are only examples, and references to particular functions herein should not be considered limiting.

In embodiments, the foldable tray may be portable and include two symmetrical sides of a folding (or otherwise collapsible) housing. When the housing is folded, the housing may resemble a book, including a center spine that can permit the folding of the halves of the housing and various three-dimensional layers between the halves. In embodiments, respective halves can be shaped such that the housing may resemble a clam shell. As will be appreciated, embodiments herein can omit items discussed, and a clamshell configuration can be adapted herein with or without the use of a spine, or using a smaller or different spine (e.g, hinge, bendable member) than is used in other embodiments. When folded, the foldable tray may be reduced to a size that facilitates easy storage or carriage. The foldable tray can include, evenly overlapping the tray's symmetrical sides and foldable therewith, an internal surface that is shielded from external contamination until the tray is unfolded to serve as an easily portable place-mat that can, for example, reduce cleaning burden.

As discussed, an internal surface of the foldable tray is retained in the foldable tray remains substantially static with respect to the two sides of the foldable. The internal surface can be cleanable and/or removable. In aspects, the internal surface can include multiple sub-components that can be separately removable. For example, the internal surface can include a pack of stacked disposable sheets. As a sheet becomes dirtied, it can be removed and discarded, and a new, clean sheet can be staged underneath the discarded sheet in the stack for immediate use. Upon exhaustion of the stack, the internal surface (or the pack previously containing the sheets) can be removed and discarded itself, and a new internal surface can be inserted with a new stack of disposable sheets. The sheets can be, for example, impermeable, and/or greaseproof, to facilitate their use with various foods or other contaminants such that materials do not soak through to more than a top-layer sheet and can be contained effectively on removal of the top-layer sheet. Sheets can additionally be biodegradable, recyclable, of recycled material, or constructed of particular materials to ensure they do not contain materials harmful to eat from and are appropriate for responsible disposal.

While particular materials (e.g., paper, plastic, and so forth) or means (e.g., folds, hinges, and so forth) are discussed for use in the construction of various components herein, it is to be appreciated that materials or means described are interchangeable, and that such discussion is intended for purposes of example only. Descriptions of materials, dimensions, construction, and so forth are not exclusive or exhaustive, and, in embodiments, any suitable material or means can be employed. In particular embodiments, dishwasher safe materials can be used in conjunction with one or more components disclosed herein. For example, a foldable tray can have an internal surface removed and be placed in a dishwasher (or otherwise be exposed to wet, high-temperature and/or soap or chemical cleaning). In another example, the internal surface can be placed in a dishwasher independently or with the foldable tray.

As used herein, "internal" and "external" can refer to particular components that can be respectively inside or outside of a folding tray when the tray is in a folded position. Similarly, "top" and "bottom" can be the portions of the folding tray that can be respectively up or down when the folding tray is in an unfolded position and placed for use such that the internal portion can be accessible and the external portion can be in contact with some extrinsic support. The top can accordingly corresponds to the internal portion, and the bottom can correspond to the external portion.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Features that are described and/or illustrated with respect to one embodiment may be used in the same way or in a similar way in one or more other embodiments and/or in combination with or instead of the features of the other embodiments. These and further aspects and features will be apparent with reference to the following description and attached drawings. In the description and drawings, particular embodiments of the subject innovation have been disclosed in detail as being indicative of some of the ways in which the principles of the subject innovation may be employed, but it is understood that the subject innovation is not limited correspondingly in scope. Rather, the subject innovation includes all changes, modifications and equivalents coming within the scope of the claims appended hereto. The accompanying illustrations are examples of the subject disclosure, but the innovation can appear in various embodiments depending on, for example, varying tray sizes and personal customizations that are not illustrated here.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs. It should be emphasized that the term "comprises/comprising" when used in this specification is taken to indicate the presence of stated features, integers, steps or components but does not preclude the presence or addition of one or more other features, integers, steps, components or groups thereof.

FIGS. 1-3 illustrate perspective views of a foldable tray 100 according to embodiments of the invention. Foldable tray 100 is shown folded in FIGS. 1A, 1B, and 1C. When folded, internal surfaces of foldable tray 100 can be isolated from external contact and/or contamination. Foldable tray 100 can include foldable housing first half 110, foldable housing second half 120, center spine 130, and soft discs 111 and 112. In embodiments, foldable tray 100 can further include folding lock 131.

In embodiments, foldable housing first half 110 and foldable housing second half 120 can be substantially symmetrical (except, in embodiments, for mating fasteners for which opposite components exist on each respective component). Foldable housing first half 110, foldable housing second half 120, center spine 130, and/or other components of foldable tray 100 can be made of, for example, silicone sheets. In embodiments, silicone sheets can be from one-sixteenth of an inch to one-eighth of one inch thick. Other thicknesses are possible without departing from the scope or spirit of the invention. Further, varying portions or components of foldable tray 100 need not be constructed of the same material or to the same thickness. In embodiments, other materials or combinations of materials can be used. For example, a thin sheet of cardboard or wood can be used for one or more components. In another example, a thin sheet of cardboard or wood used can be further wrapped in plastic or rubber for one or more components. In embodiments, foldable tray 100 or various components thereof can be made of soft or flexible materials (e.g., cloths, bendable plastics, and so forth). These and other examples can be used in accordance with the disclosures herein without departing from the scope or spirit of the invention.

Foldable housing first half 110 and foldable housing second half 120 can be offset by the distance of center spine 130. Center spine 130 can allow foldable housing first half 110 and foldable housing second half 120 (as well as materials overlapping, there between, or within) to fold neatly together. Center spine 130 can include two folds capable of permitting foldable housing first half 110 and foldable housing second half 120 to rotate at least 90 degrees each with respect to center spine 130 such that the two portions can meet or touch when foldable tray 100 is folded.

In embodiments, center spine 130 can include one or more hinges, pivots, or other alternatives to facilitate folding of foldable tray 100.

In embodiments, foldable tray 100 can include folding lock 131. Folding lock 131 can be a means for maintaining foldable tray 100 in a folded position. In embodiments, folding lock 131 can be a button, snap, clasp, magnet, hook-and-loop contact point, et cetera, that reinforces contact between foldable housing first half 110 and foldable housing second half 120, maintaining foldable housing first half 110 and foldable housing second half 120 in a closed position when foldable tray 100 is folded. In embodiments, folding lock 131 can include a tether or other extender that extends around a portion of foldable tray 100 (e.g., a dimension of spine 130). Folding lock 131, or similar aspects, can be referred to herein as a fold closure and/or fold fastener.

In embodiments, a folding lock 131 can include a zipper. The zipper can extend along one or more portions of one side of foldable tray 100, along one or more entire sides of foldable tray 100, or entirely around open portions of foldable tray 100. In a specific embodiment, the zipper can surround foldable housing first half 110 and foldable housing second half 120 to the ends of center spine 130, and can fully seal the portion of foldable tray 100 inside the fold when the zipper is entirely zipped. In an alternative embodiment, center spine 130 can be omitted, and foldable housing first half 110 and foldable housing second half 120 can completely detach from one another when the zipper is completely unzipped. Other possibilities (e.g., flexible center spine or lanyard between detachable parts of foldable tray 100 in conjunction with a zipper) will be appreciated upon study of the disclosures herein.

Various embodiments of foldable tray 100 can include first outer spine 116 and second outer spine 126. First outer spine 116 and second outer spine 126 can act as spines for additional folding members, as flanges to retain members inserted in foldable tray 100, and/or as flanges that block contaminants from entering through gaps between foldable housing first half 110 and foldable housing second half 120 when folded.

Turning now to FIGS. 2A and 2B, foldable tray 100 is shown unfolded. Center spine 130 is visible centered between foldable housing first half 110 and foldable housing second half 120. Folding lock 131 is shown mirrored by folding lock 131' which can be a second portion of folding lock 131 disposed on an opposite portion of foldable tray 100.

Foldable tray 100 can further include surface 150 that is isolated from contamination at least while foldable tray 100 is in a folded state. Surface 150 can be a hygienic internal surface. Surface 150 can span across foldable housing first half 110, center spine 130, and foldable housing second half 120.

Shown connected to foldable housing first half 110 and foldable housing second half 120, respectively, are first retaining leg 115 and second retaining leg 125. First retaining leg 115 and second retaining leg 125 can be offset from and/or be folded into foldable housing first half 110 and foldable housing second half 120 by first outer spine 116 and second outer spine 126, respectively. First retaining leg 115 and second retaining leg 125 can at least retain or cover a portion of surface 150.

In FIG. 2A, soft discs 111, 112, 121, and 122 are visible on the back/bottom (e.g., when unfolded) or exterior portion (e.g., when folded) of foldable tray 100. Soft discs 111, 112, 121, and 122 can prevent foldable tray 100 from sliding or shifting when placed on a smooth surface (e.g., an available surface on which foldable tray 100 rests) by providing points of contact with increased friction. Soft discs can be an example of an item referred to as a bumper elsewhere herein. In addition to preventing sliding, bumpers can be utilized to dampen impacts such as the closure of foldable tray 100. Bumpers can function standalone or be mirrored by other bumpers that contact one another when the surfaces to which the bumpers are affixed come within two bumpers' widths of one another.

In embodiments, foldable tray 100 can include flanges (not shown) projecting from one or more edges of foldable housing first half 110, foldable housing second half 120, center spine 130, or other components. The flanges can project inward and contact one another when foldable tray 100 is in a folded state, and project upward when foldable tray 100 is in an unfolded state and placed flat on level support. Flanges can be substantially perpendicular to a plane defined by at least a portion of foldable housing first half 110 and/or foldable housing second half 120. The flanges can retain material placed onto foldable tray 100 and prevent the material from leaving foldable tray 100 when moved around an internal surface of foldable tray 100. For example, a young child attempting to eat food from foldable tray 100 may have trouble gripping the food and push the food around foldable tray 100. The flanges can prevent the food from being pushed off the tray, which could otherwise obviate desired results of the tray's use.

Turning now to FIG. 3, an embodiment of foldable tray 100 is shown wherein first retaining leg 115 and second retaining leg 125 can be rotated approximately 270 degrees (or an amount appropriate to support foldable tray 100) to elevate or raise foldable tray 100. In alternative embodiments, various other elevating components can be integrated into foldable tray 100 (in addition to or in lieu of first retaining leg 115 and second retaining leg 125) without departing from the scope or spirit of the invention. For example, folding, collapsible, or otherwise stow-able legs can be mounted on the external surfaces of foldable housing first half 110 and/or foldable housing second half 120. Elevating components can generally be referred to herein as risers. In embodiments, risers can be stowed, facilitating convenient folding of foldable tray 100.

Despite the forgoing, in alternative embodiments, first retaining leg 115 and second retaining leg 125 may not be configured to support foldable tray 100 in an elevated position, and may exist exclusively to retain or cover at least a portion of surface 150. Different embodiments herein can restrict or permit rotation of first retaining leg 115 and second retaining leg 125 in various ways, but an amount of rotation does not necessitate configuration of first retaining leg 115 and second retaining leg 125 for elevating foldable tray 100.

Figure 4A:
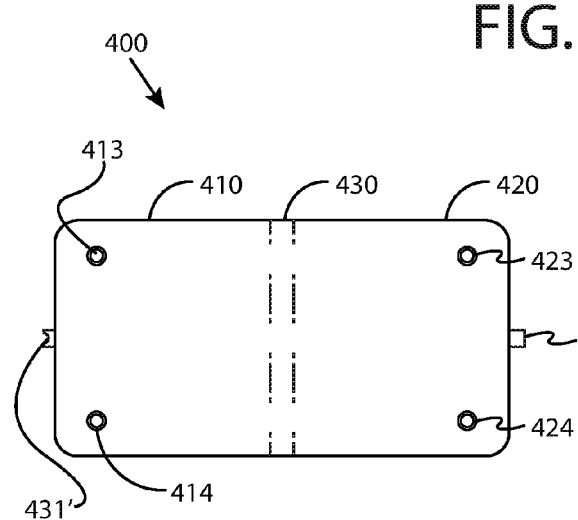
FIGS. 4A and 4B illustrate front and back views of an example embodiment of a foldable tray in accordance with aspects herein.
Figure 4B:
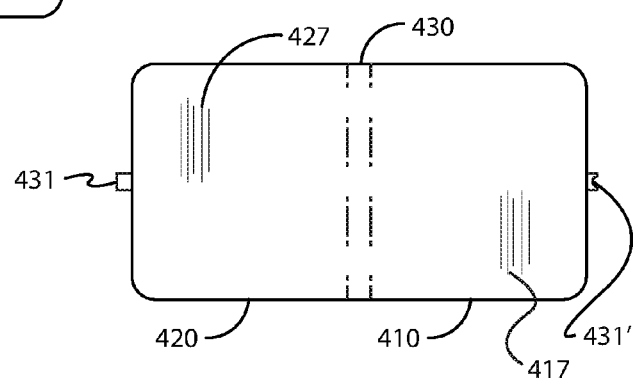

Turning now to FIGS. 4A and 4B, illustrated is an alternative embodiment of a tray 400 as disclosed herein. Tray 400 can include first half 410, second half 420, spine 430, catch 431 (and, in embodiments, 431'), and surface fasteners 413, 414, 423, and 424. In addition, embodiments of tray 400 can include texturing 417 and 427 (e.g., be textured with knurling, recesses, soft discs, rubberization, and other aspects). FIG. 4A illustrates the inside/top of unfolded tray 400, and FIG. 4B illustrates the outside/bottom of unfolded tray 400.

Surface fasteners 413, 414, 423, and 424 can be used to attach a hygienic surface (e.g., for eating, working, et cetera) to an interior (when folded) or top (when unfolded and placed on a flat plane) portion of tray 400, first half 410, and/or second half 420. In embodiments, surface fasteners 413, 414, 423, and 424 can be one or more of ball-and-socket fasteners, snapping buttons (e.g., press-snap buttons, spring-snap buttons, cherry buttons, prong-snap buttons, various post/socket configured buttons, and others), hook-and-loop arrangements, buckles, clasps (springing, fold-over, claw, toggle, barrel, insert, and others), zippers, et cetera. In such embodiments, a hygienic surface to be attached can include a mating portion that connects with surface fasteners 413, 414, 423, and 424. For example, a surface can have a receiver for a ball-and-socket fastener, a respective male or female portion of a snap button, or others in accordance with the herein. Such multi-part fasteners can be referred to as comprising, for example, fastener first parts and fasteners second parts, as well as other subsequent parts. In alternative or complementary embodiments, surface fasteners 413, 414, 423, and/or 424 can include components that retain the surface without requiring a mating portion on the surface. Such aspects can be referred to as fixed retaining members. For example, various layers to corners or sides, clips, clamps, slides, and other retainers can be employed such that all portions required for one or more of surface fasteners 413, 414, 423, and 424 (or one particular fastening means of surface fasteners 413, 414, 423, and 424 where multiple means are employed) to retain a surface are contained exclusively on first half 410 and/or second half 420, and do not require mating portions on internal surfaces. For example, corners or other portions of the surface can be tucked under one or more fixed retaining members. In another example, one or more portions of the surface can be punched in to retaining recesses that can include rigid geometry (e.g., eyelet-type) and/or flexible members (e.g., rubber or plastic grippers that including a cover slit in multiple directions above a recess that catch on an inserted material). These fasteners can be reconfigurable (e.g., move slide, slide from under clip or fold, open clasp) to allow removal and/or replacement of retained objects.

FIG. 4B shows the back/bottom of unfolded tray 400, which may face away from a user when tray 400 is in use (e.g., open and placed). First half 410 can include texturing 417, and second half can include texturing 427. Texturing 417 and 427 can include knurling, rubberizing, or other configurations or treatments intended to prevent movement of tray 400 when opened on smooth surfaces. In embodiments, only a portion of the exterior side of first half 410 and/or second half 420 includes texturing 417 and/or 427. In alternative embodiments, texturing 417 and/or 427 can cover an entire portion of the exterior/bottom of tray 400, including first half 410, second half 420, and spine 430. Various alternative or complementary embodiments can include various patterns of texturing 417 and 427, and can include multiple types of texturing or other stabilizing means (e.g., soft discs, adhesives, suction cups, and others) used in a single apparatus.

Figure 5:
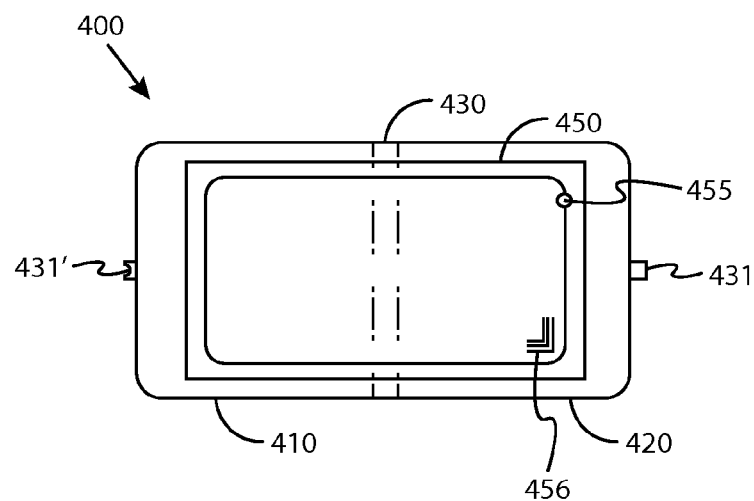
FIG. 5 illustrates a view of an example embodiment of a foldable tray with an internal surface in accordance with aspects herein.

FIG. 5 illustrates tray 400 including surface 450 inserted. Surface 450 is a hygienic internal surface. As illustrated in FIG. 5, means for fastening surface 450 to first half 410 and second half 420 are obscured by overlap of surface 450 with other aspects of tray 400. As shown, surface 450 can cover at least a portion of both first half 410 and second half 420, and can fold in place when tray 400 is folded. A maximum thickness of surface 450 can be used to determine an appropriate dimension of spine 430 to facilitate folding of tray 400.

In embodiments, surface 450 can include replaceable sheets 456. In such embodiments, surface 450 and similar aspects can be referred to as a cutaway retainer. Replaceable sheets 456 can be a plurality of clean sheets stacked, such that when one is removed, a new clean sheet is available immediately underneath. Surface 450 can be a retaining portion for replaceable sheets 456. In support of using replaceable sheets 456, surface 450 can include cutaway 455 to allow at least a portion of replaceable sheets 456 to be exposed and facilitate removal of a sheet among replaceable sheets 456. In embodiments, the exposed portion can be the usable portion of, for example, an eating surface. The eating surface can be the exposed area of a replaceable sheet. While eating is a function of the present innovation, such aspects are not intended to exclude others. In embodiments, a flap, cover, or seal can be used in conjunction with cutaway 455 to cover replaceable sheets 456.

In embodiments, replaceable sheets 456 can be included on a roll. For example, a roll sized to be accommodated by the spine of a foldable tray can be placed near a spine and facilitate a replaceable sheet surface, where replacing the surface can include disposing of the old portion and rolling out a new portion. In embodiments, replaceable sheets 456 can be connected (e.g., either in a roll or flat-folded configuration) as one continuous sheet or a series of perforated sheets. In still alternative embodiments, replaceable sheets 456 can be physically separate sheets that are folded and partially overlapped such that a sheet is repositioned upon removal of another sheet above said sheet.

In alternative embodiments, surface 450 need not include replaceable sheets 456, and may be a removable surface that can be cleaned or replaced singly.

In various embodiments of tray 400, one or more portions can be constructed of soft materials (e.g., foam, contained uncompressed fiber, rubber, and others). In alternative or complementary embodiments, softening attachments made at least in part of soft materials can be affixed to various edges or portions of components of tray 400. Soft materials can be used to avoid, for example, damage to tray 400 (e.g., if dropped, slammed shut, et cetera) and/or harm to users (e.g., fingers closed in tray 400, head contacts tray 400, et cetera).

Figure 6A:
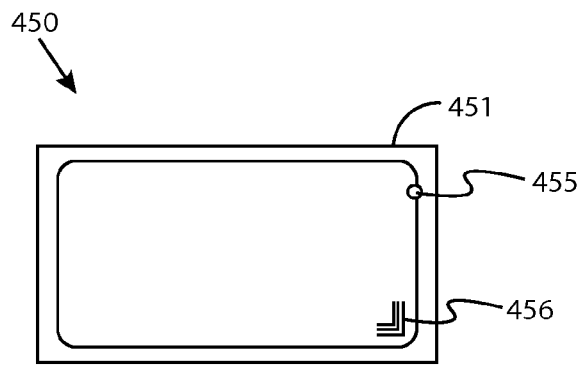
FIGS. 6A and 6B illustrate front and back views of an example embodiment of a surface for use with a foldable tray in accordance with aspects herein.
Figure 6B:
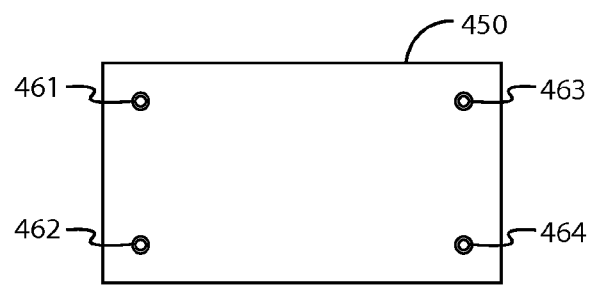

FIG. 6 illustrates an embodiment of surface 450 for use with a foldable tray in greater detail. Surface 450 can include shell 451, cutaway 455, and replaceable sheets 456. In embodiments, surface 450 can include attachment points 461, 462, 463, and 464, for securing at least a portion of surface 450 to a tray. Attachment points 461, 462, 463, and 464 can be disposed on a side opposite cutaway 455 and/or primary access to replaceable sheets 456 on surface 450. In embodiments, surface 450 can be removed and replaced when replaceable sheets 456 are exhausted. In alternative embodiments, attachments points 461, 462, 463, and 464 are permanent attachments, and surface 450 can remain in a tray permanently. In such embodiments, replaceable sheets 456 can be replaced into the same shell 451 instead of replacing all of surface 450. In embodiments, one or more of surface 450, shell 451, and replaceable sheets 456 can be referred to as "inserts," and associated components can be insert components (e.g., insert fasteners that fasten the inserts to a foldable tray).

Replaceable sheets 456 can be, for example, various combinations of papers (e.g., parchment, cotton fiber, plain), polymers (e.g., plastic, rubber, silicone), waxes, metals, and others. In embodiments, replaceable sheets 456 can be paper-thin sheets of material that are constructed, coated, or lined, on one or both sides, with various materials to provide desired performance. For example, materials that are impermeable (e.g., fluids or gases do not pass-through or destroy the material), greaseproof, resistant to tearing, resistant to deformation in heat or cold, nonreactive, and/or biodegradable can be used or combined. In embodiments, additional materials can be included (e.g., absorptive layer or padding) to better adapt to particular applications of replaceable sheets 456. In embodiments, replaceable sheets 456 can be cleanable and/or reusable (e.g., dishwasher-safe, laundry-safe, hand-washable, and others) and can be replaced into shell 451 for repeated uses after cleaning. In other embodiments, replaceable sheets 456 are designed for disposal after one or more uses and/or exposures. In embodiments of techniques described herein, multiple versions or types of replaceable sheets 456 can be used with a single tray apparatus. For example, different types of replaceable sheets 456 (e.g., some paper-plastic combination, some paper-only) can be made available separately or in combined packs (e.g., shell 451 contains alternating or different types of replaceable sheets 456) that are all compatible with the same tray.

Figure 7A:
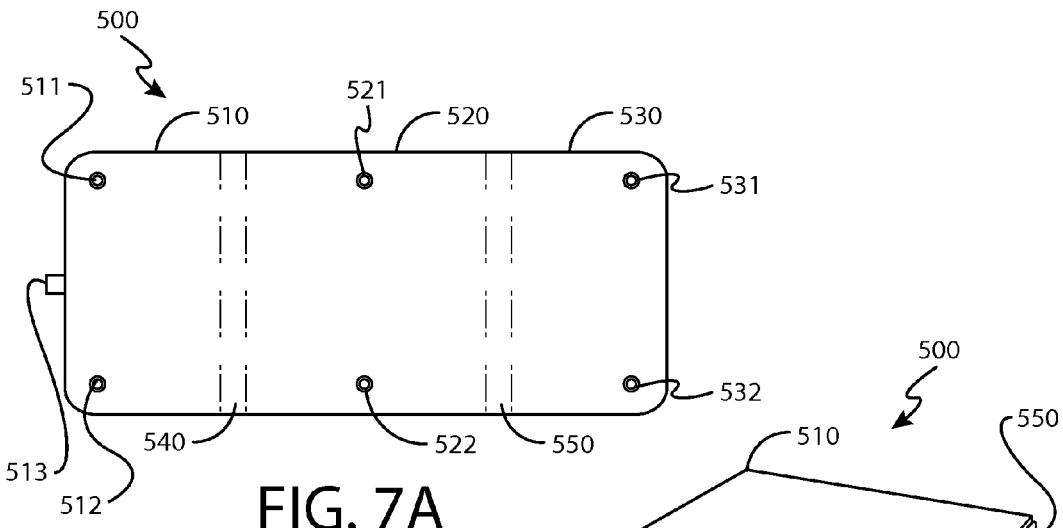
FIGS. 7A and 7B illustrate open and closed views of an example embodiment of a multi-spine foldable tray in accordance with aspects herein.
Figure 7B:
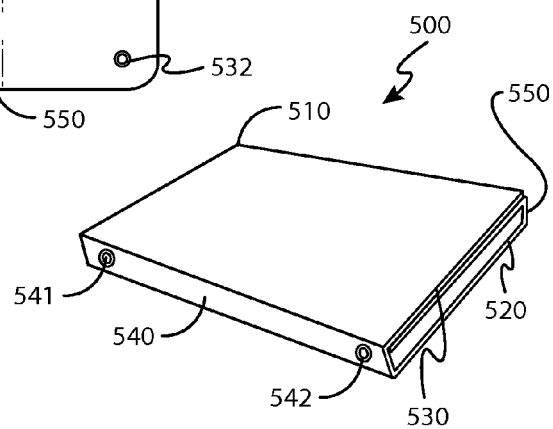

While the foregoing has primarily been directed toward at least partially symmetrical, single-spine embodiments, alternatives are cognizable under the disclosures herein. Turning to FIGS. 7A and 7B, illustrated are open and closed views of an example embodiment of a multi-spine foldable tray 500 in accordance with aspects herein. As shown, multi-spine foldable tray 500 can include two spines 540 and 550 for a tri-fold configuration. While FIGS. 7A and 7B illustrate a tri-fold configuration, four-fold or higher order fold configurations (e.g., with all folds parallel, with non-parallel folds) can also be realized in accordance with the disclosures herein.

Multi-spine foldable tray 500 can include first section 510, second section 520, and third section 530. First section 510, second section 520, and third section 530 can be connected by spines 540 and 550. In embodiments, a surface (e.g., surface 540) can be configured to overlay at least one of first section 510, second section 520, and third section 530. A surface can be retained in a position that overlays at least one of first section 510, second section 520, and third section 530, for example, through use of one or more of attachments points 511, 512, 521, 522, 531, and/or 532.

Multi-spine foldable tray 500 can further include closure 513 to secure multi-spine foldable tray 500 in a closed position. While FIGS. 7A and 7B show closure 513 attached to at least first section 510, it is to be appreciated that closure 513 can be located on any component or subcomponent of multi-spine foldable tray 500. In additional or complementary embodiments, friction increasing attachments 541 and 542 can reduce the likelihood of multi-spine foldable tray 500 displacing against smooth materials (e.g., an available surface on which multi-spine foldable tray 500 rests) when opened as in FIG. 7A. In the illustrated embodiment, friction increasing attachments 541 and 542 are shown on an exterior portion of spine 540. It is to be appreciated that in various embodiments, friction increasing attachments 541 and 542 can be located on any exterior portion of multi-spine foldable tray 500.

Figure 8A:
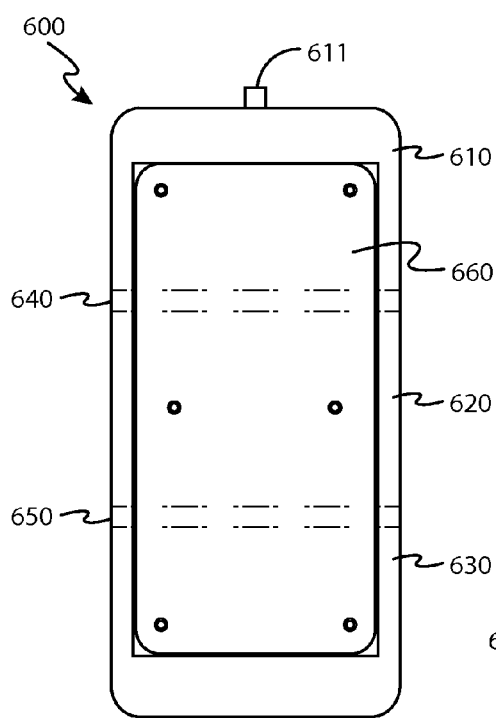
FIGS. 8A and 8B illustrate unfolded and folded views of an example embodiment of a two-spine foldable tray in accordance with aspects herein.
Figure 8B:
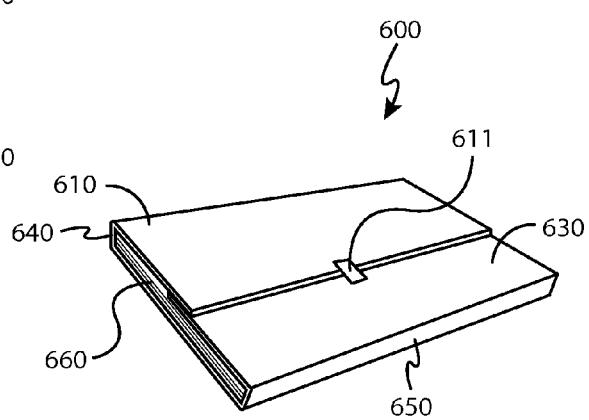

While multi-spine foldable tray 500 shows first section 510, second section 520, and third section 530 that substantially overlay one another when multi-spine foldable tray 500 is folded, it is to be appreciated that asymmetrical configurations can be accomplished without departing from the scope or spirit of the innovation. FIGS. 8A and 8B illustrate unfolded and folded views of an example embodiment of a two-spine foldable tray 600 in accordance with aspects herein. As shown, two-spine foldable tray 600 can include first section 610, second section 620, and third section 630 attached by spines 640 and 650. Two-spine foldable tray 600 can further include internal surface 660 and closure 611. As shown in FIG. 8B, at least second section 620 is larger than one or more of first section 610 and third section 630. Accordingly, first section 610 and third section 630 can have a partial overlap or meet along a line overlapping second section 620 when two-spine foldable tray 600 is in a folded configuration.

Various alternative configurations to those illustrated can be utilized without departing from the disclosed innovation. For example, techniques employing three or more folds, techniques employing multiple fold directions (e.g., sections fold about perpendicular axes) and additional structural designs (e.g., accordion-type spines, shells, and/or other components to accommodate multiple widths) can all be utilized herein. In embodiments, multiple surfaces can be included in a single foldable tray, and/or a foldable tray can unfold in multiple directions for multiple simultaneous uses (e.g., two persons eating from the same foldable tray but on different surfaces, different materials placed atop different surfaces, and others).

Figure 9:
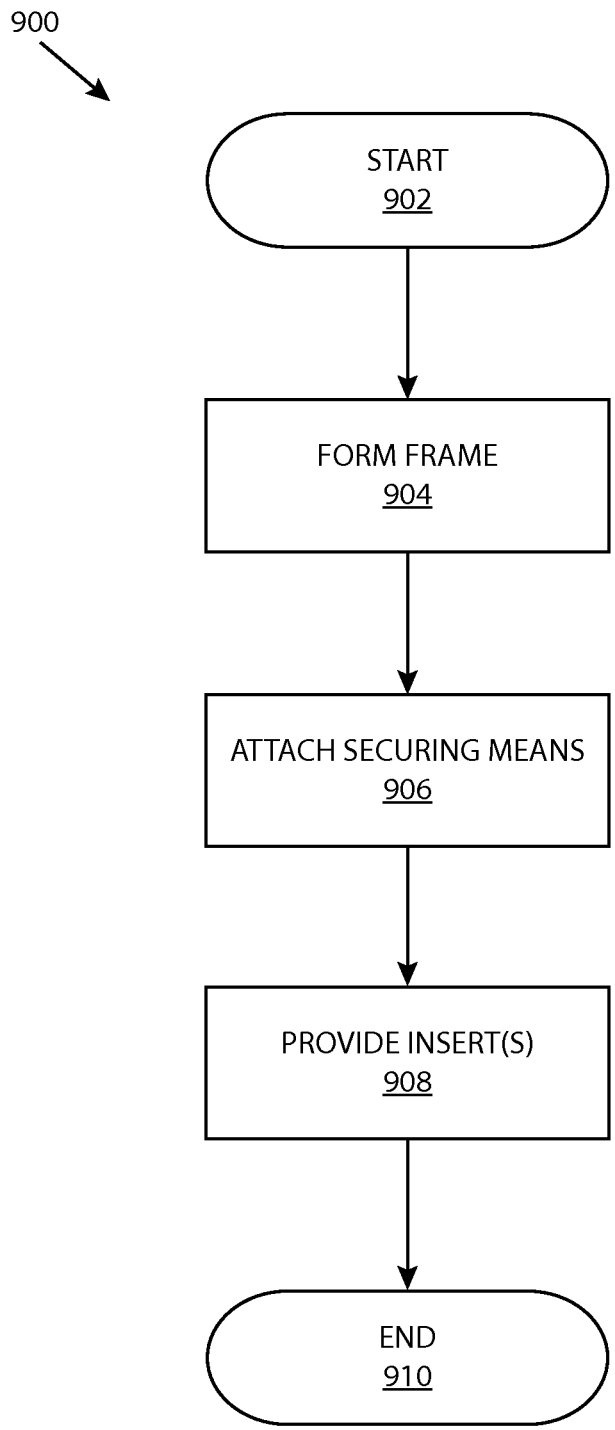
FIG. 9 illustrates a flow chart of an example embodiment of a methodology for making a foldable tray in accordance with aspects herein.

Turning now to FIG. 9, illustrated is a block diagram of an example methodology 900 for making a foldable tray as described herein. Methodology 900 can start at 902 and proceed to 904, when a frame is formed. Forming of the frame can include cutting a single shape from a material to be formed into the frame, cutting multiple parts of a frame separately for attachment (e.g., respective halves, spines, and others), molding the shape or shapes to be formed into the frame (e.g., inject plastic into shaped molds), and others. If the frame is in multiple portions, the frame's portions can be attached. If the frame is in a single portion, the portion can be bent, folded, or otherwise shaped to the geometries of the frame. While various techniques can be added, removed, or otherwise intervene, forming of the frame at 904 ultimately produces a frame for use with a foldable tray in accordance with disclosures herein. In embodiments, knurling or texturing can be performed on one or more portions of the frame at 904.

At 906, various securing means can be attached to the frame. For example, various snaps, clamps, hooks, et cetera can be attached to various portions of the formed frame to facilitate retention of one or more inserts, securing the frame in a folded or unfolded state, and other ends. In embodiments, additional aspects can be attached (e.g., soft discs, suction cups, aesthetic elements such as decals, soft components or attachments, and others) at 906 as well.

At 908, one or more inserts can be provided for use with the formed frame. For example, a surface can be provided for use in a foldable tray. In embodiments, the surface can be a removable surface that can be replaced or cleaned independently. In embodiments, the surface can include a plurality of replaceable sheets, and the surface can be replaced with a new surface of new replaceable sheets at a later time. After providing the surface at 908, methodology 900 can proceed to end at 910.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A portable foldable tray, comprising:
   a foldable housing comprising a first section and a second section, the first section containing a first pair of insert fasteners and the second section having a second pair of insert fasteners;
   a spine connecting the first section and the second section at a spine width; and
   a cut away retainer that overlaps at least one portion of a first internal side of the first section and at least one portion of a second internal side of the second section, and wherein the cut away retainer comprises a foldable insert shell and a plurality of individually removable sheets, wherein the foldable insert shell packages the individually removable sheets and further wherein the foldable insert shell contains first attachment fasteners configured to removably couple to the first pair of insert fasteners and second attachment fasteners configured to removably couple to the second pair of insert fasteners, and wherein the cut away retainer is removable from the at least one portion of the first internal side and the at least one portion of the second internal side, the cut away retainer folds along a portion that coincides with the spine, and the plurality of individually removable sheets are impermeable to fluids.

2. The portable foldable tray of claim 1, further comprising a friction increasing component on at least one external side of at least the first section and the second section.

3. The portable foldable tray of claim 2, wherein the friction increasing component includes at least one soft disc.

4. The portable foldable tray of claim 2, wherein the friction increasing component consists of texturing of at least a portion of the external side.

5. The portable foldable tray of claim 1, further comprising a fold closure that secures the first section to the second section in a folded configuration.

6. The portable foldable tray of claim 5, the fold closure includes at least a fastener lengthened by a tether.

7. The portable foldable tray of claim 1, wherein the plurality of individually removable sheets are stacked.

8. The portable foldable tray of claim 1 further comprising at least one softening attachment along at least one edge of the first section, the second section, or the spine.

9. The portable foldable tray of claim 1, wherein the cut away retainer is configured to be isolated from contact with an available surface on which the portable foldable tray is placed.

10. A method for providing a folding tray, comprising:
    forming a folding tray housing including a first section and a second section, the first section containing a first pair of insert fasteners and the second section having a second pair of insert fasteners;
    forming a spine about a junction of the first section and the second section; and
    providing a cut away retainer within the folding tray housing, wherein the cut away retainer comprises a foldable insert shell and a plurality of individually removable sheets, wherein the foldable insert shell packages the individually removable sheets, wherein the foldable insert shell overlaps at least a portion of at least one first internal side of the first section and at least one portion of a second internal side of the second section, and wherein the foldable insert shell contains first attachment fasteners configured to removably couple to the first pair of insert fasteners and second attachment fasteners configured to removably couple to the second pair of insert fasteners, and wherein the cut away retainer is removable from overlapped portions of the at least one first internal side and the at least one second internal side, wherein the cut away retainer folds along a portion that coincides with the spine, and wherein the plurality of individually removable sheets are impermeable to fluids.

11. The method of claim 10, further comprising providing a friction increasing component on at least one external side of at least the first section and the second section.

12. The method of claim 11, wherein the folding tray is configured to be frictionally engaged against an available surface such that the cut away retainer is configured to be isolated from contact with the available surface on which the folding tray is placed.

* * * * *